United States Patent [19]

Watkins

[11] Patent Number: 4,778,137

[45] Date of Patent: Oct. 18, 1988

[54] LIFT BASE

[75] Inventor: Marvin C. Watkins, Cincinnati, Ohio

[73] Assignee: F & F Koenigkramer, Inc., Cincinnati, Ohio

[21] Appl. No.: 75,358

[22] Filed: Jul. 20, 1987

[51] Int. Cl.[4] .............................................. F16M 13/00

[52] U.S. Cl. ..................................... 248/418; 248/161

[58] Field of Search ............... 248/161, 425, 669, 416, 248/418; 297/345, 71, 349, 339, 346; 296/65 R; 108/141, 142

[56] References Cited

U.S. PATENT DOCUMENTS

| | | | |
|---|---|---|---|
| 1,629,939 | 5/1927 | Turner . | |
| 2,845,990 | 8/1958 | Hubert . | |
| 2,854,061 | 9/1958 | Romito | 248/418 X |
| 2,854,065 | 9/1958 | Fox . | |
| 2,909,247 | 10/1959 | Romito . | |
| 3,642,088 | 2/1972 | Smith . | |
| 3,674,308 | 7/1972 | Radding . | |
| 3,758,064 | 9/1973 | Sawaki | 248/418 X |
| 3,910,633 | 10/1975 | Marsh . | |
| 3,923,276 | 12/1975 | Kimber | 248/654 |
| 3,975,050 | 8/1976 | McKee . | |
| 4,058,282 | 11/1977 | Wahls | 248/418 |
| 4,061,304 | 12/1977 | Schattmaier | 297/345 X |
| 4,267,999 | 5/1981 | Chekirda | 248/425 X |
| 4,408,743 | 10/1983 | DeWitt et al. . | |
| 4,655,632 | 4/1987 | Smith | 297/349 X |
| 4,667,918 | 5/1987 | Page | 248/417 X |

*Primary Examiner*—J. Franklin Foss

*Attorney, Agent, or Firm*—Wood, Herron & Evans

[57] ABSTRACT

A lift base for raising and lowering objects such as an ophthalmological chair comprises a piston rotatably and axially movable within a cylinder and connected to a base support which mounts the chair or other object. A sleeve keyed to the cylinder is movable axially relative thereto but locked against rotation. A locking assembly carried by the support is effective to move the sleeve between an unlocked position out of contact with the sleeve wherein both axial and rotational movement of the base support and piston is permitted, and a locked position into contact with the sleeve wherein rotational movement of the piston and base support is prevented but axial movement thereof is permitted.

6 Claims, 2 Drawing Sheets

LIFT BASE

FIELD OF THE INVENTION

This invention relates to an apparatus for raising and lowering objects, and, more particularly, to a lift base particularly adapted for use with an examination/treatment chair to raise and lower the chair while either locking out or permitting rotational movement of the chair.

BACKGROUND OF THE INVENTION

Recent advancements in laser technology have enabled ophthalmologists to perform many surgical procedures on the eyes in their own offices on an outpatient basis rather than employing the facilities of a hospital or clinic. These procedures are performed with the patient in a sitting or reclined position in a specially designed ophthalmological chair. In order to properly adjust the position of the patient relative to the equipment used in the surgery, the chair must be movable both vertically and rotationally with a minimum of effort.

Patient chairs for ophthalmologists or other physicians with similar requirements generally comprise a chair portion including a seat support and back rest which are mounted above the floor upon a lift base. In the prior art, lift bases for ophthalmological chairs and the like include a cylinder having a piston which is vertically movable for raising and lowering the seat support and back rest of the chair. In some designs, the seat support portion of the chair is mounted by bearings to the piston to permit rotation of the chair with respect to the piston. The piston is rotatably fixed, but movable vertically relative to the cylinder to raise and lower the seat and back support. A locking mechanism such as a brake is provided to prevent rotation of the seat support and back rest relative to the piston as desired.

The bearing connection between the piston and seat of the prior art lift bases described above is relatively expensive and has been eliminated in other prior art lift base designs. In these prior art designs, the piston is fixed to the seat support of the chair and is both vertically movable and rotatable relative to the cylinder.

The problem with prior art lift base designs having a rotatable piston is that the chair cannot be locked against rotational movement without also preventing vertical movement of the piston relative to the cylinder. In some surgical procedures, it is desirable to secure the seat from rotational movement while allowing the seat to continue to be raised and lowered. But in prior art lift bases employing a rotatable piston, the locking mechanism which prevents rotation of the seat and piston must be unlocked before the piston can be raised or lowered to adjust the vertical position of the seat.

SUMMARY OF THE INVENTION

It is therefore among the objectives of this invention to provide a lift base for an object such as an ophthalmological chair which is relatively economical to manufacture and which is capable of locking the chair against rotational movement while permitting continued raising or lowering of the chair to the desired vertical position.

These objectives are accomplished in a lift base comprising a cylinder having a piston carried therein which is vertically and rotatably movable with respect to the cylinder. The piston mounts a support, which, in turn, mounts a chair or other object to be raised and lowered.

A locking assembly connected between the cylinder and support is effective in an unlocked position to permit both vertical movement and rotation of the piston and support relative to the cylinder; and, in a locked position, to prevent rotation of the support and piston while permitting continued vertical motion thereof.

In the presently preferred embodiment, the piston is rotatably and axially carried within the cylinder and mounts at its upper end a base support which carries a flange adapted to mount the seat portion of a chair. A sleeve is concentrically disposed about the cylinder and is vertically movable relative thereto by guide means in the form of a key and keyway connection. Preferably, a pair of keys are mounted 180° apart on the exterior surface of the cylinder which mate with aligning keyways mounted to the interior surface of the sleeve. The sleeve is slidable vertically along the cylinder but is locked by the key-keyway connection from rotational movement relative to the cylinder.

A pair of pins are mounted to the interior surface of the sleeve at its top end which are carried within an annular groove formed in the base support for the chair. The base support, and the piston to which it is mounted, are rotatable on the opposed pins of the rotatably fixed sleeve.

An important aspect of this invention is the capability to lock out or prevent rotational movement of the piston and sleeve while permitting continued vertical movement of the piston and support to raise and lower the chair. In the presently preferred embodiment, this is accomplished by operation of a brake shoe which is axially movable relative to the exterior surface of the sleeve within a mount carried by the support. In a first or unlocked position, the brake shoe is moved out of engagement with the sleeve to permit rotational movement of the support and piston upon the pins carried by the rotatably fixed sleeve. The brake shoe is axially movable to a second or locked position in which it bears against the sleeve and forces it into contact with the base support for the chair.

Since the sleeve is rotatably fixed, contact between the sleeve and base support prevents further rotation of the support and piston relative to the cylinder. Nevertheless, vertical movement of the piston and base support is not restricted because the sleeve is vertically movable along its key-keyway connection to the exterior of the cylinder. In this manner, rotation of the piston, base support and chair can be locked out or prevented while permitting continued raising and lowering of the chair as desired.

DESCRIPTION OF THE DRAWINGS

The structure, operation and advantages of the presently preferred embodiment of this invention will become further apparent upon a consideration of the following description, taken in conjunction with the accompanying drawings, wherein.

DETAILED DESCRIPTION OF THE INVENTION

Figure 1:
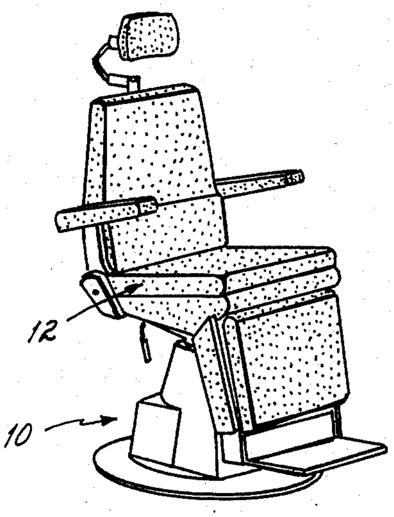
FIG. 1 is an overall isometric view of an examination/treatment chair mounted atop the lift base of this invention.

Referring now to the Figures, the lift base 10 is adapted to support an examination/treatment chair 12 of the type schematically illustrated in FIG. 1. The lift base 10 comprises a cylinder 14 having a housing 16 defining a hollow interior 18 and an exterior surface 20. The base of cylinder 14 is preferably fixedly mounted to a base block 22 by a weldment 24 or other means of permanent fixation. Additionally, a plurality of lag bolts 26 extends from the cylinder cap 28 mounted at the top of cylinder 14 into the base block 22. The cap 28 is secured to the cylinder 14 by acorn nuts 27 to permit assembly and disassembly. In the presently preferred embodiment, a pair of keys 30, 32 are welded to the exterior surface 20 of cylinder 14 approximately 180° apart. Each of the keys 30, 32 is preferably in the form of a rectangular plate.

A piston tube 34 is positioned within the hollow interior 18 of cylinder 14 which extends between the cylinder cap 28 and base block 22. The piston tube 34 receives a piston 36 which is mounted for axial and rotational movement within the piston tube 34 by a lower wear ring 40. The wear ring 40 is mounted on one side of an annular collar 44, the other side of which mounts a lip seal 47. The lip seal 47 functions to seal the upper portion of the piston 36 above the lip seal 47. A seal 46 encloses the top end 48 of the piston 36, the top end 48 being mounted to a base support 52 by a bolt 50. The support 52 is formed with an annular groove 54, and has a seat support flange 56 positioned on its top. A pin 57 extending between the flange 56 and base support 52 prevents rotation of the chair 12 relative to the piston 36.

Raising and lowering of the piston 36 with respect to the cylinder 14 is accomplished hydraulically and forms no part of this invention per se. Briefly, the base block 22 is formed with a chamber 58 communicating with an inlet line 60 via a passageway 62 which is opened and closed by a one way valve 64. The chamber 58 is connected by an outlet 66 to the interior of the piston tube 34 beneath the bottom of the piston 36.

Pressurized fluid from a source (not shown) is directed through the inlet line 60 into passageway 62 which unseats the one way valve 64. The fluid fills the chamber 58 and then flows through the outlet 66 into the piston tube 34 to raise the piston 36. A release line 68 connected to a solenoid valve (not shown) is formed in the base block 22 in communication with the chamber 58. In order to lower the piston 36, the solenoid valve is opened allowing the fluid to escape chamber 58 through the release line 68 which simultaneously closes the one way valve 64.

Figure 2:
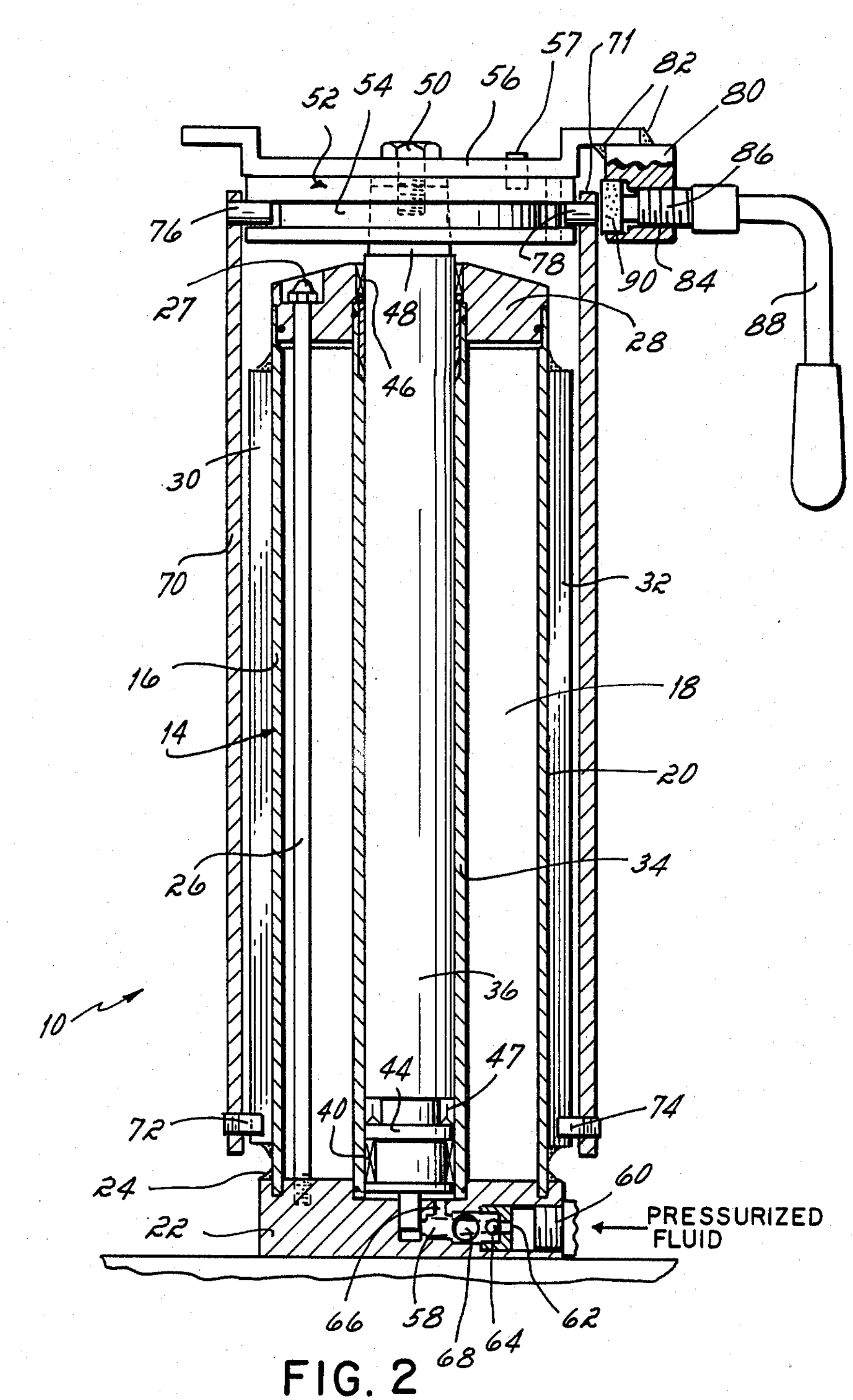
FIG. 2 is a cross sectional view of the lift base herein in an unlocked position.

It is desirable in some applications to prevent rotation of the piston 36 and base support 52 relative to the cylinder 14 while permitting continued vertical movement thereof to raise and lower the chair 12 as desired. The structure for locking out or preventing rotational movement of the piston 36 and base support 52 is best shown in FIG. 2. This structure includes an annular sleeve 70 which is concentrically disposed about the exterior surface 20 of the cylinder 14. A pair of opposed keyways 72, 74 are mounted to the base of sleeve 70 in a position to mate with the keys 30, 32, respectively, on the exterior surface 20 of cylinder 14. The key-keyway connection between the sleeve 70 and cylinder 14 permits vertical movement of the sleeve 70 with respect to the cylinder 14 but locks the sleeve 70 against rotational movement since the cylinder 14 is fixedly mounted to the base block 22. The upper or top end of the sleeve 70 includes a pair of pins 76, 78 mounted approximately 180° apart on the interior surface thereof. The pins 76, 78 are carried within the annular groove 54 of base support 52 to permit rotation of the base support 52 with respect to the sleeve 70.

A mounting block 80 is mounted by weldments 82 to the flange 56 mounted on the base support 52. The mounting block 80 is formed with a threaded bore 84 which receives a screw 86 axially movable therewithin. The outer end of the screw 86 is connected to a handle 88, and the opposite, inner end of the screw 86 supports a lock shoe 90..

Figure 3:
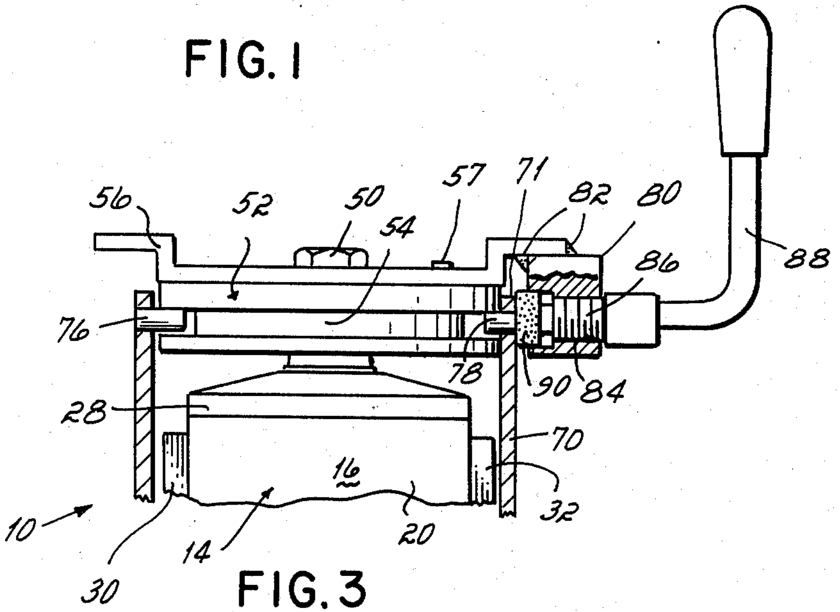
FIG. 3 is a partial view of FIG. 2 with the lift base in a locked position.

As illustrated in FIG. 2, with the handle 88 in a downward position, the screw 86 is moved to an axial position wherein the lock shoe 90 is spaced from the sleeve 70. In this position, the top end 71 of sleeve 70 is spaced from the base support 52. This permits rotational movement of the base support 52 with piston 36 as the pins 76, 78 of the sleeve 70 ride within the annular groove 54 of base support 52. Rotation of the handle 88 to an up position as shown in FIG. 3, rotates the screw 86 within threaded bore 84 to move the lock shoe 90 axially into contact with the sleeve 70. In turn, the top end 71 of the sleeve 70 bears against the base support 52 preventing rotation thereof.

The lift base 10 of this invention is therefore capable of raising or lowering the chair 12 while either permitting or locking out rotation of the chair 12 as desired. For example, in the event it is desired to raise or lower the chair 12 while permitting it to rotate, the handle 88 is placed in the down position as illustrated in FIG. 2. The pressurized fluid entering the base block 22 raises the piston 36 as described above. In turn, the base support 52, flange 56 and sleeve 70 move upwardly with the extension of piston 36 relative to cylinder 14. The keyways 72, 74 of the sleeve 70 vertically slide along the keys 30, 32 of cylinder 14 to permit such vertical motion.

If at any time during the use of chair 12 it is desired to lock out or prevent rotation of the base support, the handle is moved to the upper position as illustrated in FIG. 3. This forces the lock shoe 90 against the top end 71 of the sleeve 70, which, in turn, forces the top end 71 against the base support 52. Since the sleeve 70 is prevented from rotating by its connection to the fixed cylinder 14, the base support 52, piston 36 and flange 56 are also prevented from rotating upon contact with the lock shoe 90. Vertical movement is not prevented, however, because the sleeve 70 is free to move vertically relative to the cylinder 14 via the key-keyway connection therebetween. Accordingly, the chair 12 can be raised and lowered at the same time its rotational movement is prevented by the lift base 10 of this invention.

While the invention has been described with reference to a preferred embodiment, it should be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. For example, the lift base 10 is illustrated in the Figures as being adapted to support an ophthalmological chair 12. It should be understood that the base support 52 and flange 56 could be modified or removed to enable the lift base 10 to be utilized for raising and lowering essentially any other object such as another type of a chair, a platform, or the like.

Therefore, it is intended that the invention not be limited to the particular embodiment disclosed as the best mode contemplated for carrying out this invention, but that the invention will include all embodiments falling within the scope of the appended claims.

What is claimed is:

1. Apparatus for raising and lowering an object, comprising:

a cylinder having an interior;

a piston carried within said interior of said cylinder, said piston being axially and rotatably movable with respect to said cylinder;

a support for the object mounted to said piston, said support being formed with an annular groove, said support being axially and rotatably movable with said piston relative to said cylinder;

a sleeve formed with at least two pins rotatably carried within said annular groove of said support for mounting said sleeve to said support;

guide means interconnecting said sleeve and said cylinder for permitting axial movement of said sleeve relative to said cylinder while preventing rotation of said sleeve relative to said cylinder;

locking means for moving said sleeve between a first position and a second position relative to said support, said sleeve being effective in said first position to permit rotation of said support and said piston relative to said cylinder while permitting axial movement thereof, said sleeve being effective in said second position to prevent rotation of said support and said piston relative to said cylinder while permitting axial movement thereof.

2. The apparatus of claim 1 in which said locking means includes a lock shoe carried by said support, said lock shoe being movable between a first position in which said lock shoe is spaced from said sleeve, and a second position in which said lock shoe forces said sleeve against said support to prevent rotation of said support and said piston relative to said sleeve and said cylinder housing.

3. The apparatus of claim 2 in which said locking means comprises:

a mounting block having an internally threaded bore, said mounting block being carried by said support;

a screw axially movable within said threaded bore of said mounting block, said screw being connected at one end to a handle and at the other end to said lock shoe, said handle being effective to rotate said screw for moving said brake shoe between said first position and said second position.

4. A lift base for an examination/treatment chair comprising:

a cylinder having an interior;

a piston carried within said interior of said cylinder, said piston being axially and rotatably movable with respect to said cylinder;

a support having a flange adapted to mount the examination/treatment chair, said support being formed with an annular groove, said support being mounted to said piston and axially and rotatably movable therewith relative to said cylinder;

a sleeve formed with at least two pins rotatably carried within said annular groove of said support for mounting said sleeve to said support;

guide means interconnecting said sleeve and said cylinder for permitting axial movement of said sleeve relative to said cylinder while preventing rotation of said sleeve relative to said cylinder;

locking means for moving said sleeve between a first position and a second position relative to said support, said sleeve being effective in said first position to permit rotation of said support and said piston relative to said cylinder while permitting axial movement thereof, said sleeve being effective in said second position to prevent rotation of said support and said piston relative to said cylinder while permitting axial movement thereof.

5. The apparatus of claim 4 in which said locking means includes a lock shoe carried by said support, said lock shoe being movable between a first position in which said lock shoe is spaced from said sleeve, and a second position in which said lock shoe forces said sleeve against said support to prevent rotation of said support and said piston relative to said sleeve and said cylinder housing.

6. The apparatus of claim 5 in which said locking means comprises:

a mounting block having an internally threaded bore, said mounting block being carried by said support;

a screw axially movable within said threaded bore of said mounting block, said screw being connected at one end to a handle and at the other end to said lock shoe, said handle being effective to rotate said screw for moving said brake shoe between said first position and said second position.

* * * * *